(12) United States Patent
Zukowski et al.

(10) Patent No.: US 11,507,574 B1
(45) Date of Patent: Nov. 22, 2022

(54) ADAPTIVE SELECTION OF A PROCESSING METHOD BASED ON OBSERVED PERFORMANCE FOR IMPROVED AND ROBUST SYSTEM EFFICIENCY

(71) Applicant: Actian Netherlands B.V., Amsterdam (NL)

(72) Inventors: Marcin Zukowski, Amsterdam (NL); Bogdan Raducanu, Amsterdam (NL); Peter Boncz, Amsterdam (NL)

(73) Assignee: ACTIAN NETHERLANDS B.V., Amsterdam (NL)

( * ) Notice: Subject to any disclaimer, the term of this patent is extended or adjusted under 35 U.S.C. 154(b) by 1081 days.

(21) Appl. No.: 13/802,648

(22) Filed: Mar. 13, 2013

(51) Int. Cl.
*G06F 16/2453* (2019.01)

(52) U.S. Cl.
CPC .................. *G06F 16/2453* (2019.01)

(58) Field of Classification Search
USPC ........................................ 707/713, 718, 736
See application file for complete search history.

(56) References Cited

U.S. PATENT DOCUMENTS

| | | | |
|---|---|---|---|
| 590,855 A | 9/1897 | Phelps, Jr. | |
| 5,680,557 A | 10/1997 | Karamchetty | |
| 5,920,855 A | 7/1999 | Aggarwal et al. | |
| 6,292,186 B1 | 9/2001 | Lehman et al. | |
| 6,336,124 B1 | 1/2002 | Alam et al. | |
| 6,343,275 B1 | 1/2002 | Wong | |
| 6,463,582 B1 | 10/2002 | Lethin et al. | |
| 6,546,388 B1 | 4/2003 | Edlund et al. | |
| 7,086,047 B1* | 8/2006 | Edwards | G06F 8/443 717/106 |
| 7,089,362 B2 | 8/2006 | Creta et al. | |
| 7,404,182 B1 | 7/2008 | Garthwaite et al. | |
| 7,448,048 B1 | 11/2008 | Nesamoney et al. | |
| 7,685,580 B1 | 3/2010 | Detlefs et al. | |
| 7,730,079 B2* | 6/2010 | Meijer et al. | 707/760 |
| 7,783,681 B1 | 8/2010 | Delsart | |
| 7,849,444 B2 | 12/2010 | Melamed et al. | |
| 8,001,021 B1* | 8/2011 | Quinn et al. | 705/31 |
| 8,095,738 B2 | 1/2012 | Benhase et al. | |
| 8,200,527 B1 | 6/2012 | Thompson et al. | |
| 8,260,803 B2 | 9/2012 | Hsu et al. | |
| 8,271,965 B2 | 9/2012 | Wang | |
| 8,364,519 B1 | 1/2013 | Basu et al. | |

(Continued)

FOREIGN PATENT DOCUMENTS

| | | |
|---|---|---|
| EP | 855656 A2 | 7/1998 |
| EP | 754325 B1 | 12/2000 |

OTHER PUBLICATIONS

Bodgan Raducanu, *Micro Adaptivity in a Vectorized Database System*, Master Thesis in Parallel and Distributed Computer Systems, Universitatea Politehnica Bucuresti / Vrije Universiteit van Amsterdam, Aug. 2012 (62 pages).

(Continued)

*Primary Examiner* — Kris E Mackes
*Assistant Examiner* — Soheila (Gina) Davanlou
(74) *Attorney, Agent, or Firm* — ArentFox Schiff LLP

(57) ABSTRACT

A system and method for improved query processing in a database are provided, where different methods of performing the same task can be adaptively chosen. The system can then adapt to different and changing environments, resulting in improved and more stable performance.

22 Claims, 12 Drawing Sheets

(56) References Cited

U.S. PATENT DOCUMENTS

| | | | |
|---|---|---|---|
| 8,386,845 B1 | 2/2013 | Gharpure et al. | |
| 8,417,789 B1 | 4/2013 | Gopalan et al. | |
| 8,423,981 B2 | 4/2013 | Hudson et al. | |
| 8,606,994 B2 | 12/2013 | Ledford | |
| 8,626,725 B2 | 1/2014 | Netz et al. | |
| 8,767,957 B1* | 7/2014 | Bagchi et al. | 380/29 |
| 8,825,959 B1 | 9/2014 | Switakowki et al. | |
| 9,110,946 B2 | 8/2015 | Chen et al. | |
| 9,171,041 B1 | 10/2015 | Narayanan et al. | |
| 2002/0083049 A1* | 6/2002 | Forster et al. | 707/3 |
| 2002/0165848 A1 | 11/2002 | Rautenbach et al. | |
| 2003/0005134 A1 | 1/2003 | Martin et al. | |
| 2003/0120654 A1 | 6/2003 | Edlund et al. | |
| 2003/0220931 A1* | 11/2003 | Sexton et al. | 707/100 |
| 2005/0084152 A1 | 4/2005 | McPeake et al. | |
| 2005/0167917 A1 | 8/2005 | MacIver et al. | |
| 2005/0209988 A1 | 9/2005 | Cunningham et al. | |
| 2005/0216421 A1 | 9/2005 | Barry et al. | |
| 2005/0222996 A1* | 10/2005 | Yalamanchi | G06F 17/30386 |
| 2006/0167917 A1 | 7/2006 | Solomon | |
| 2006/0200741 A1 | 9/2006 | DeMesa et al. | |
| 2006/0212244 A1 | 9/2006 | Levine et al. | |
| 2006/0224542 A1* | 10/2006 | Yalamanchi | 706/47 |
| 2006/0293934 A1 | 12/2006 | Tsyganskiy et al. | |
| 2007/0067573 A1 | 3/2007 | Bruening et al. | |
| 2007/0240136 A1 | 10/2007 | Garyali et al. | |
| 2008/0059492 A1 | 3/2008 | Tarin | |
| 2008/0066145 A1 | 3/2008 | Molen et al. | |
| 2008/0120469 A1 | 5/2008 | Kornegay et al. | |
| 2008/0235181 A1* | 9/2008 | Faunce | G06F 17/30469 |
| 2008/0243969 A1 | 10/2008 | Wintergerst et al. | |
| 2008/0244471 A1* | 10/2008 | Killian et al. | 716/1 |
| 2009/0007116 A1 | 1/2009 | Duffy et al. | |
| 2009/0249446 A1 | 10/2009 | Jenkins et al. | |
| 2009/0254572 A1 | 10/2009 | Redlich et al. | |
| 2009/0300631 A1 | 12/2009 | Karlapalem et al. | |
| 2010/0114915 A1 | 5/2010 | Gorton, Jr. | |
| 2010/0235335 A1 | 9/2010 | Heman et al. | |
| 2010/0250497 A1 | 9/2010 | Redlich et al. | |
| 2010/0268773 A1 | 10/2010 | Hunt et al. | |
| 2011/0078243 A1 | 3/2011 | Carpenter et al. | |
| 2011/0093500 A1* | 4/2011 | Meyer et al. | 707/774 |
| 2011/0208822 A1 | 8/2011 | Rathod | |
| 2011/0225232 A1 | 9/2011 | Casalaina et al. | |
| 2011/0270711 A1 | 11/2011 | Kusterer | |
| 2012/0130986 A1* | 5/2012 | Abdellatif | G06F 17/30463 707/718 |
| 2013/0173669 A1 | 7/2013 | Tang et al. | |
| 2013/0179395 A1 | 7/2013 | Heman et al. | |
| 2014/0201450 A1* | 7/2014 | Haugen | G06F 17/16 711/125 |

OTHER PUBLICATIONS

Marcin Zukowski, *Balancing Vectorized Query Execution with Bandwidth-Optimized Storage*, Ph.D. Thesis, Faculty of Science, FNWI: Informatics Institute (II), Universiteit van Amsterdam (SIKS dissertation series No. 2009-30), Sep. 11, 2009 (240 pages).

Richard A. Hankins and Jignesh M. Patel, *Data Morphing: An Adaptive, Cache-Conscious Storage Technique*, Proceedings of the 29th VLDB Conference, Berlin, Germany, 2003, pp. 1-12.

Anastassia Ailamaki, et al., *Weaving Relations for Cache Performance*, Proceedings of the 27th VLDB Conference, Rome, Italy, 2001, pp. 1-12.

Martin Grund, et al., *HYRISE—A Main Memory Hybrid Storage Engine*, VLDB '10, Sep. 1317, 2010, Singapore, Copyright 2010 VLDB Endowment, ACM 000-0-00000-000-0/00/00, pp. 1-12.

The Vertica® Analytic Database Technical Overview White Paper, A DBMS Architecture Optimized for Next-Generation DataWarehousing, Mar. 2010, pp. 1-13.

Vertica Database Data Sheet, Mar. 2010, pp. 1-3.

C. A. Lang, B. Bhattacharjee, T. Malkemus, S. Padmanabhan, and K. Wong. Increasing buffer-locality for multiple relational table scans through grouping and throttling. In ICDE, Istanbul, Turkey, 2007 (10 pgs.).

Marcin Zukowski, Sandor Hernan, Niels Nes, Peter Boncz. Cooperative Scans: Dynamic Bandwidth Sharing in a DBMS. *VLDB 2007, Vienna, Austria, Sep.* 2007 (12 pgs.).

Alicja Luszczak, *Simple Solutions for Compressed Execution in Vectorized Database System*. MSc thesis, University of Warsaw, 2011 (70 pgs.).

Daniel J. Abadi, Samuel Madden, and Miguel Ferreira. Integrating compression and execution in col. oriented database systems. In *Proceedings of the 2006 ACM SIGMOD international conference on Management of data*, 2006, pp. 671-682 (12 pgs.).

Alfons Kemper, Thomas Neumann, HyPer: A hybrid OLTP&OLAP main memory database system based on virtual memory snapshots, ICDE, 2011 (12 pgs.).

K. Krikellas, S. Viglas, and M. Cintra. Generating code for holistic query evaluation, ICDE, pp. 613-624, 2010 (12 pgs.).

J. Sompolski, Just-in-time Compilation in Vectorized Query Execution, Master thesis (94 pgs.).

J. Sompolski, M. Żukowski, P. Boncz, Vectorization vs. Compilation in Query Execution, Proceedings of the Seventh International Workshop on Data Management on New Hardware, pp. 33-40 (8 pgs.).

J. Rao, H. Pirahesh, C. Mohan, G. M. Lohman, Compiled Query Execution Engine using JVM, ICDE, 2006 (12 pgs.).

A Critique of ANSI SQL Isolation Levels. By H. Bernenson, et al. In Proc. SIGMOND, 1995.

Monet: A Next-Generation DBMS Kernel for Query-Intensive Applications. By P. Boncz. Ph.D. Thesis, Universiteit van Amsterdam, May 2002.

Monet DB/X100: Hyper-Pipelining Query Execution. By P. Boncz, et al. In Proc. CIDR, 2005.

Serializable Isolation for Snapshot Databases. By M.J. Cahil, et al. In Proc. SIGMOND, 2008.

Update Conscious Bitmap Indices. By G. Canahuate, et al.. In Proc. SSDBM 2007.

Improving Index Performance through Prefetching. By S. Chen, P.B. Gibbons, et al. In Proc. SIGMOND, 2001.

Adjoined Dimension Column Clustering to Improve Data Warehouse Query Performance. By X. Chen, et al. In Proc. ICDE, 2008.

A Decomposition Storage Model. By A. Copeland, et al. In Proc. SIGMOND, 1985.

Sorting and Indexing with Partitioned B-Tress. By G. Graefe. In Proc. CIDR, 2003.

Efficient Columnar Storage in B-Trees. By G. Graefe. SIGMOD Record, 36(1), 2007.

Fast Loads and Fast Queries. By G. Graefe. In DaWaK, 2009.

The Transaction Concept: Virtues and Limitations. By J. Gray. In Proc. VLDB, pp. 144-154, 1981.

Incremental Organization for Data Recording and Warehousing. By H.V. Jagadish, et al. In Proc. VLDB, 1997.

A Light Weight Index Structure for Data Warehousing. By G. Moerkotte. In Proc. VLDB, 1998.

Aries: A Transaction Recovery Method Supporting Fine-Granularity Locking and Partial Rollbacks Using Write-Ahead Logging. By C. Mohan, et al. TODS, 17(1), 1992.

The Log-Structured Merge-Tree. By P. O'Neil, E. Cheng, D. Gawlick, et al. Acta Informatica, 33(4), 1996.

Multi-Dimensional Clustering: A New Data Layout Scheme in db2. By S. Padmanabhan, et al. In Proc. SIGMOD, 2003.

Block Oriented Processing of Relational Database Operations in Modern Computer Architectures. By S. Padmanabhan, et al. In Proc. ICDE, 2001.

A Case for Fractured Mirrors. By R. Ramamurthy, D.J. DeWitt, et al. The VLDB Journal, 12(2):89-101, 2003.

Differential Files: Their Application to the Maintenance of Large Databases. By D. Severance, et al. ACM Trans. Database Syst., 1(3), 1976.

Data Warehouse Technology by InfoBright. By D. Slezak, et al. In Proc. SIGMOD, 2009.

(56) References Cited

OTHER PUBLICATIONS

C-Store: A Column-Oriented DBMS. By M. Stonebracker et al. In Proc. VLDB, 2005.
Counted B-Trees. By S. Tatham. In www.chiark.greenend.org.uk/sgtatham/algorithms/cbtree/html, 2001.

* cited by examiner

| | | | |
|---|---|---|---|
| (a) | Always Branching (base, in CPU cycles) | Always No-Branching (improvement over base) | Micro Adaptive (improvement over base) | Optimal (improvement over base) |
| | 57 bn. | 1.12x | 1.22x | 1.23x |
| (b) | Only GCC (base, CPU cycles) | Only ICC (impr. over base) | Only CLANG (impr. over base) | Micro Adaptive (impr. over base) | Optimal (impr. over base) |
| | 348 bn. | 0.99x | 0.99x | 1.11x | 1.11x |
| (c) | Never Loop-Fission (base, in CPU cycles) | Always Loop-Fission (improvement over base) | Micro Adaptive (improvement over base) | Optimal (improvement over base) |
| | 71 bn. | 1.40x | 1.57x | 1.57x |
| (d) | Always Selective Computation (base, in CPU cycles) | Always Full Computation (improvement over base) | Micro Adaptive (improvement over base) | Optimal (improvement over base) |
| | 33bn. | 0.57x | 1.09x | 1.10x |
| (e) | Always Loop Unrolling (8) (base, in CPU cycles) | Never Loop Unrolling (improvement over base) | Micro Adaptive (improvement over base) | Optimal (improvement over base) |
| | 348bn. | 1.01x | 1.07x | 1.07x |

Figure 10

| Query | No Heuristics (sec) | Heuristics | Micro Adaptive |
| --- | --- | --- | --- |
| Q01 | 29.22 | 1.02 | 1.10 |
| Q02 | 1.58 | 1.10 | 1.00 |
| Q03 | 1.43 | 1.08 | 1.13 |
| Q04 | 1.39 | 1.02 | 1.14 |
| Q05 | 5.05 | 1.07 | 1.08 |
| Q06 | 2.42 | 1.42 | 1.62 |
| Q07 | 7.38 | 1.06 | 1.06 |
| Q08 | 7.07 | 1.09 | 1.08 |
| Q09 | 48.72 | 1.11 | 1.09 |
| Q10 | 8.18 | 1.12 | 1.07 |
| Q11 | 2.28 | 1.10 | 1.07 |
| Q12 | 5.67 | 0.97 | 1.05 |
| Q13 | 41.9 | 1.08 | 1.03 |
| Q14 | 3.55 | 1.18 | 1.20 |
| Q15 | 1.43 | 0.90 | 1.12 |
| Q16 | 9.03 | 0.88 | 1.00 |
| Q17 | 9.47 | 1.00 | 0.99 |
| Q18 | 20.21 | 0.97 | 1.02 |
| Q19 | 18.52 | 0.99 | 1.01 |
| Q20 | 5.74 | 1.03 | 1.03 |
| Q21 | 20.9 | 1.02 | 1.08 |
| Q22 | 8.74 | 1.05 | 1.09 |
| Geo Avg | | 1.05 | 1.09 |

Figure 11

ADAPTIVE SELECTION OF A PROCESSING METHOD BASED ON OBSERVED PERFORMANCE FOR IMPROVED AND ROBUST SYSTEM EFFICIENCY

FIELD

The disclosure generally relates to a database management system and in particular to a method and system for improving data processing performance by means of adaptive selection of a processing method ("Micro Adaptivity").

BACKGROUND

A Database Management System (DBMS) is a software package that provides a reliable way to store data in a database and process it. One of the main requirements of a DBMS is to provide a coherent interface that allows application developers to manipulate data stored in a database.

The architecture of most DBMSs follows a multilayer approach, where each layer is responsible for another phase of processing. For example, typical DBMS layers may include:
1. client application, which issues a query to the DBMS
2. query parser, which parses the text representation of a query and creates an internal representation used by the DBMS
3. query optimizer, which tries to find an efficient way to execute the query and creates a query plan
4. query executor, which does the actual processing of the data
5. buffer manager, that loads data from the storage and buffers it in the memory for processing
6. storage, which handles storing data on a persistent storage device such as a hard disk It is desirable to be able to increase the efficiency and robustness of the query executor which results in overall performance improvement and reduced development time.

To demonstrate the need for a more efficient and robust query executor, an example is provided below.

For a simple SQL query, e.g. "SELECT*FROM some_table WHERE some_attribute >7", the key operation is the selection (filtering) of tuples that match the "some_attribute >7" predicate. Internally, in database systems, such a selection is implemented using a Primitive function.

The primitive function may be implemented so that it consumes the input column as the "input" array, the constant that is compared against as the "val" column, and it produces an array "result" containing the indices of tuples from "input" which match the predicate, returning the number of such tuples as "found". A simple implementation of such a function could look like:

for (i=0, found=0; i<n; i++)
if (input[i]>val)
result[found++]=i;
return found;

The above implementation uses what is known as control-dependency—depending on the output of a comparison, a different code path is taken. This behavior is called branching. Modern CPUs have branch-predictor functionality, where they try to guess what will be the path taken in a branch to optimize performance. The problem with branch prediction is that, if the guess incorrectly, additional cost is paid (see "Balancing Vectorized Query Execution with Bandwidth-Optimized Storage"; Marcin Zukowski; PhD Thesis, University of Amsterdam, Amsterdam, The Netherlands, 2009, Section 5.2.4.2 or "Micro Adaptivity in a Vectorized Database System"; Bogdan Raducanu; MSc Thesis; Vrije Universiteit Amsterdam, 2012, Section 1.1.2.)

Another implementation of the primitive function may be:
for (i=0, found=0; i<n; i++) {result [found]=i;
found+=(input[i]>val);
}
return found;

This implementation uses what is known as data-dependency. Specifically, for each value in the input, the same code is performed. The output of a comparison influences the "found" variable, but does not change the code path taken. Note, that more instructions are executed, as for every input there's some action done, but there is no branching, so the performance is less sensitive to input.

The performance of these two functions varies greatly depending on the input characteristics as shown in FIG. 8. For (popular) cases with selectivities (i.e. percentage of tuples matching the predicate) close to 0% or 100%, the control-dependency solution works very well (up to 2× better than data-dependency). This is because the CPU can predict the branch outcome well then, hence no penalty for wrong choices is paid, and fewer instructions are executed. However, for other selectivities, data-dependency solution can be much faster (e.g. 3×). This is because the CPU can't guess correctly the outcome of the branch, and even though fewer CPU instructions are actually executed, they are more expensive. Here, avoiding the branch is worth the additional instruction calls.

Since inside the same system various selectivities can be observed (even within the same query) none of these functions would provide an optimal performance overall. It is desirable to provide a method and system that makes query execution not only resistant to, but also benefiting from such performance differences, allowing easy integration with a modern DBMS and it is to this end that the disclosure is directed.

BRIEF DESCRIPTION OF THE DRAWINGS

FIGS. 10a-e are diagrams illustrating a performance impact of Micro Adaptivity system with five example types of different primitive flavors; and FIG. 11 is a diagram illustrating a performance impact of the Micro Adaptivity system on 22 queries from TPC-H.

DETAILED DESCRIPTION OF ONE OR MORE EMBODIMENTS

The disclosure is particularly applicable to a Micro Adaptivity system implemented in a Vectorwise database system and it is in this context that the disclosure will be described. It will be appreciated, however, that the Micro Adaptivity system and method has greater utility since the system and method can be used with any database system. The system and method has a potential of improving query execution efficiency in different database systems, translating to overall system performance. Before describing the details of Micro Adaptivity, an overview of an example of a database system on which the Micro Adaptivity may be implemented is described.

Figure 1:
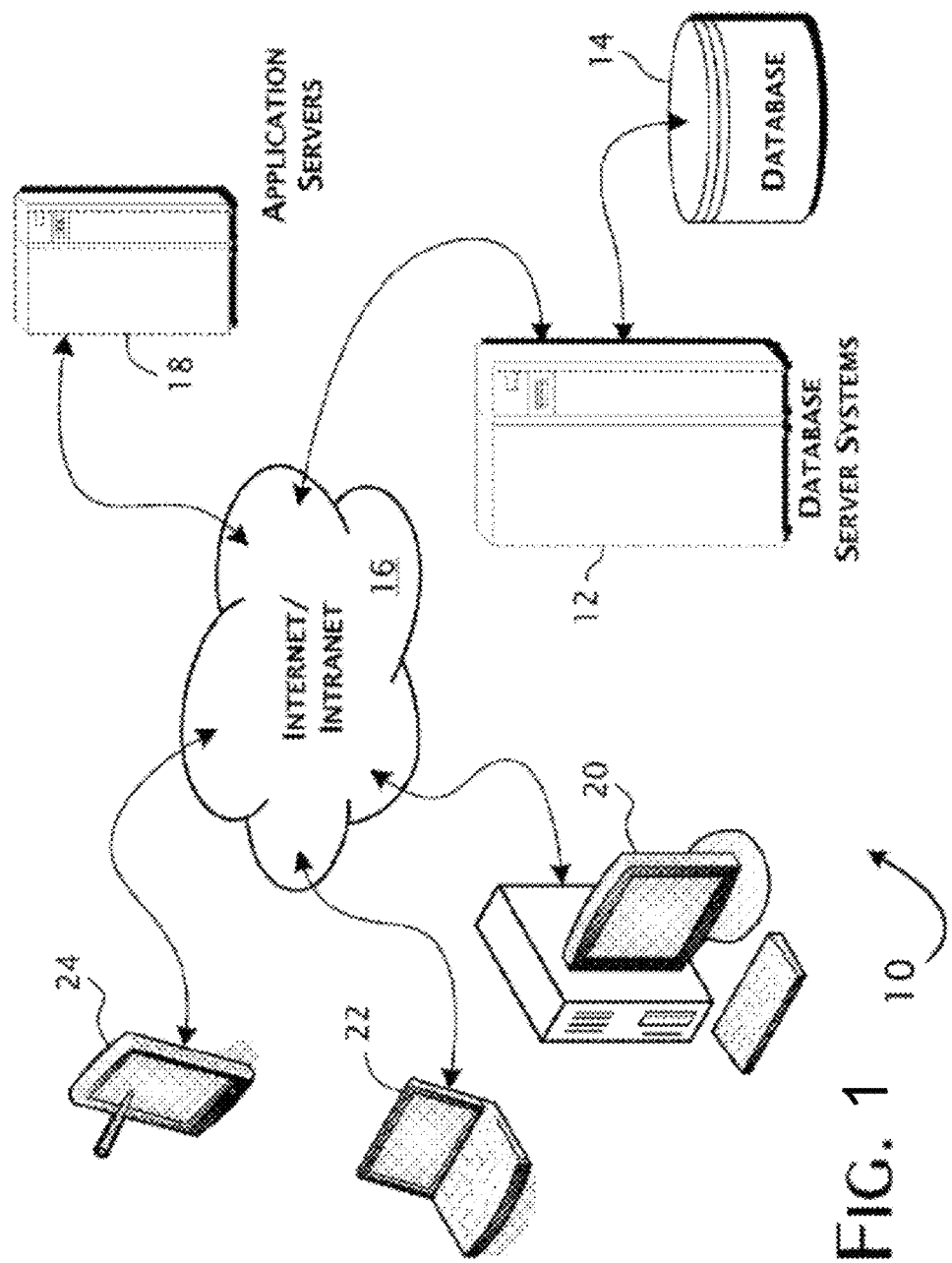
FIG. 1 is a system diagram illustrating an implementation of an operating environment of a database system.

FIG. 1 is a system diagram illustrating an implementation of an operating environment 10 of a database system. In the environment, one or more database server systems 12 host, directly or indirectly, a storage device 14, such as for example a database. Access requests are typically received over a wired or wireless link 16, such as for example, the Internet and intranet or other networks, from various sources such as for example one or more application servers 18 that are each executing on-line transaction processing (OLTP) and/or online analytical processing (OLAP) applications. The specific operations of the applications are typically directed by or executed in support of requests from one or more computing units, such as for example, client applications executed on client computers 20 of various types including mobile computers 22 and communications devices 24. Each computing unit may be a processing unit based device with sufficient processing power, memory and connectivity to interact with the database server system 12. For example, each computing device may be a smartphone (Apple iPhone, RIM Blackberry, Android based devices), a personal computer, a tablet computer and the like.

Figure 2:
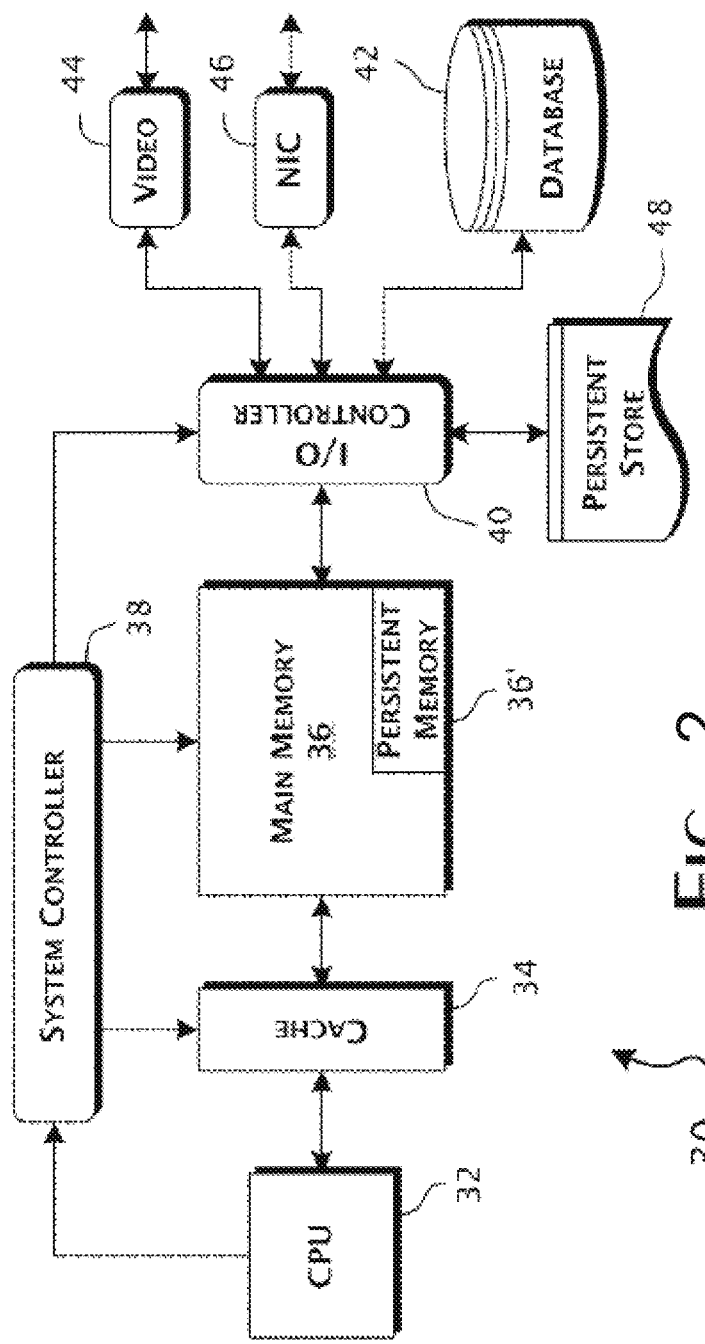
FIG. 2 is a simplified block diagram of an implementation of a computer database system.

FIG. 2 is a simplified block diagram of an implementation of a computer database system 30 for the database system 12 that may implement the predictive buffer management method. The database system 30 may include one or more central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32 and the main memory 36 will be substantially larger. A portion 36' of the main memory store 36 may be implemented to be persistent memory so that the data is maintained even when power is removed, such as by using Flash memory or a conventional backup battery solution. A system controller 38 manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or flash emulation disk, may also be provided.

Figure 3:
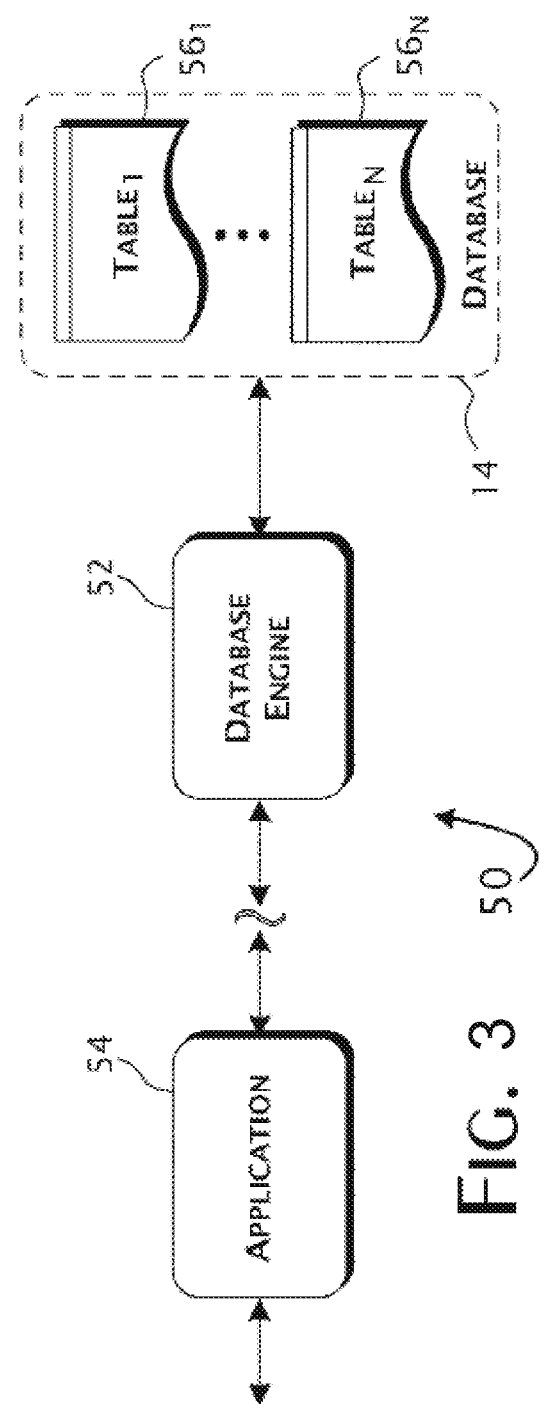
FIG. 3 is a block diagram illustrating a preferred tiered implementation of the database system.

FIG. 3 is a block diagram illustrating a preferred tiered implementation of the database system execution environment 50 that is implemented in or as part of a database engine 52. Database read and update requests are received from one or more applications 54 and satisfied by access to a database 14 containing one or more data tables, such as $56_1, \ldots, 56_N$ as shown in FIG. 3. The one or more applications 54 may be executed local or remote with respect to the database engine 52. The database 14 may be implemented using a physical storage device 42 connected directly to a database server system 12 that executes the database engine 52 or remotely through storage area network (SAN) or other distributed data storage system.

The above database system, including the database engine 52, may implement a Micro Adaptivity system and method. The Micro Adaptivity system and method may be implemented in hardware and interact with a database server or DBMS, but may also be implemented in software and be part of the database engine 52 or database management system (DBMS) that executes on the database servers of the database system.

Figure 4:
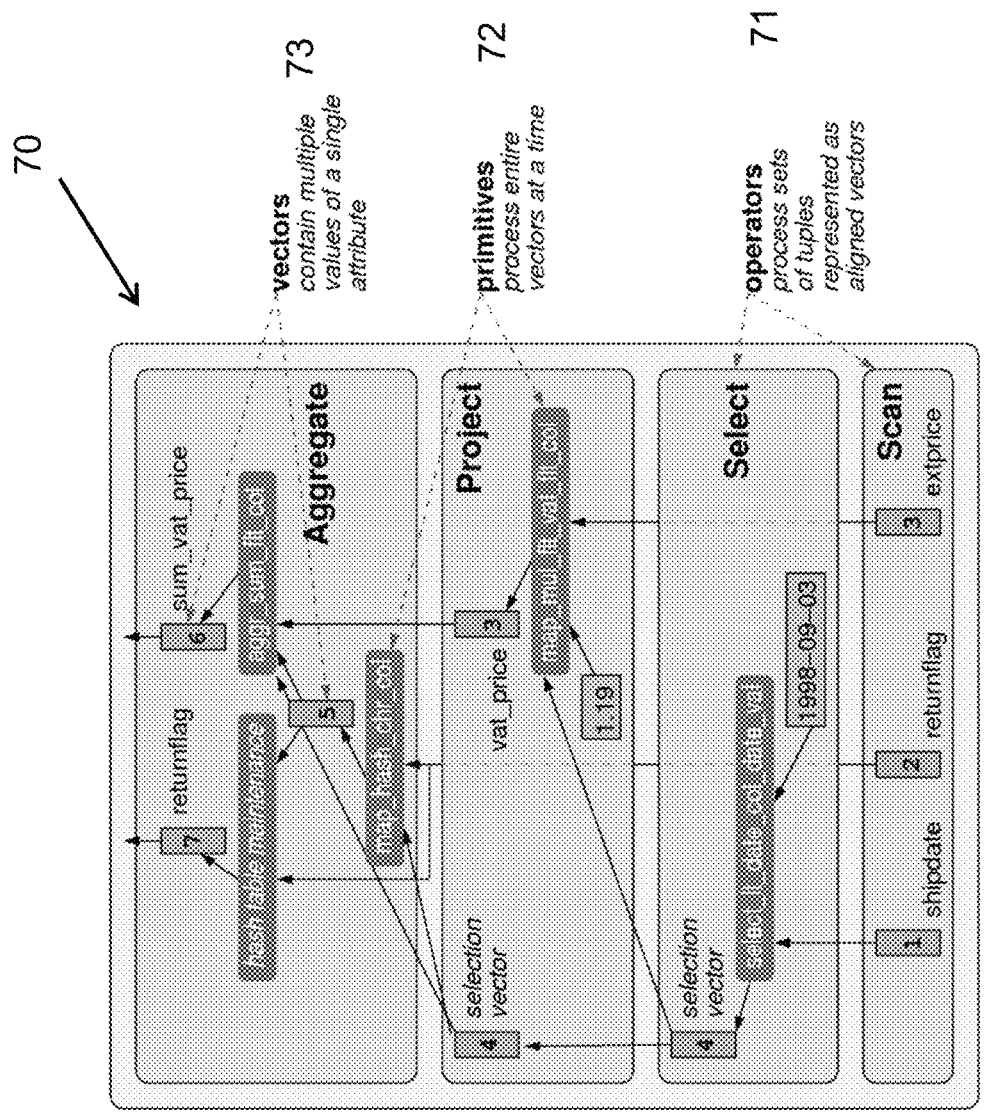
FIG. 4 is a block diagram illustrating a possible implementation of the data processing layer in the database system.

FIG. 4 is a diagram of a query execution layer 70 that is part of the database engine 52 which manages actual data processing and transformation. The query execution layer may include "Operator" objects 71, "Primitive" objects 72 and data storage elements 73, such as vectors when the query execution layer is part of the Vectorwise system. The operator objects 71 represent different possible types of operations including functions that perform low-level data processing operations, specific for different operations which are the primitives 72. This embodiment is given as an example, other variations of this design with similar functionality are possible, and the proposed Micro Adaptivity system and method can be also applied in such designs. More details of this embodiment of the query execution layer 70 are available in Section 4.2 of "Balancing Vectorized Query Execution with Bandwidth-Optimized Storage"; Marcin Zukowski; PhD Thesis, University of Amsterdam, Amsterdam, The Netherlands, 2009.

In systems built on designs like the query execution layer 70, the relational query, typically provided by the user in SQL, is internally represented as a tree of Operator objects. Each Operator represents a logic specific for a given relational operation (e.g. selection, aggregation or join). This logic is usually the same regardless of the data types used in a particular query, or even details of the operations performed—for example, Select operator logic is the same if the predicate used is "WHERE x>7" or "WHERE y SIMILAR TO z". The query-specific data-processing operations are expressed with Primitive functions. For example, one can have a Primitive function selecting values larger than 7 in a column of floating-point numbers, another that adds two integer attributes, another which extracts a day of week from a date, etc.

A Primitive can provide one of many different functions including selection, computation. A primitive may also implement functions internal to the Operator logic, for example hash value computation, finding an element in a hash table, updating an aggregate etc. As a result, the total number of Primitives in the system can be very high (e.g. thousands of functions). Also, it is typical for Primitive objects to consume the majority of the query processing time. As such, it is important to have simple and automatic ways to guarantee good performance of these functions.

The system may also have specialized primitive objects that are generated for each combination of an operation type and input data types. For example, different Primitive functions will be used to compute "WHERE shipdate <'1998-09-02' depending if "shipdate" is an attribute of type "date", "timestamp" etc.

In the embodiment described herein, each Primitive is identified with a "Primitive Signature" representing the above parameter combination. In FIG. 4, for example, a Primitive that selects tuples ("sel") using a "less than" comparison ("lt") of a date attribute ("col" from "column") with a date constant ("val" from "value") is identified as "sel_lt_date_col_date_val". Today, for each Primitive Signature, there is a single Primitive implementation.

In most database systems, a set of default Primitives are created during the system compilation time, and registered in a "Primitive Dictionary" component. The primitive dictionary provides the function of mapping Primitive Signatures onto the matching Primitive implementation. It is important to note that within a single query plan (a set of queries to be performed in a particular order) there are multiple Primitive functions used and a single Primitive function can be used in multiple parts of the query. Each occurrence of a Primitive in a query plan may be known as a "Primitive Instance".

Figure 5:
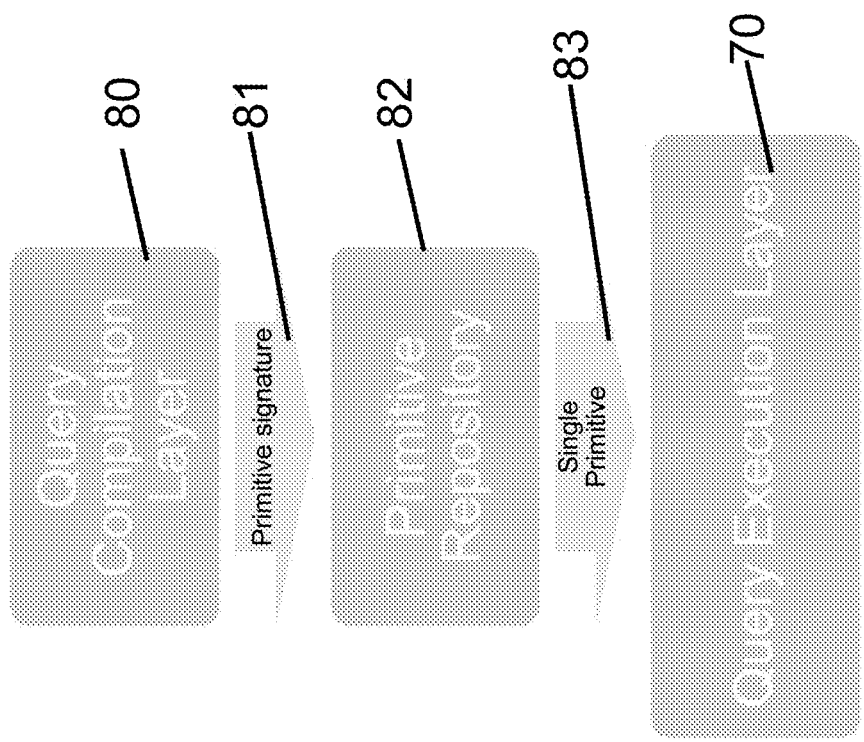
FIG. 5 is a block diagram illustrating obtaining a Primitive object in a standard system.

FIG. 5 demonstrates the process of obtaining Primitives in a database system. Before a query is executed, in a Query Compilation layer 80, a Primitive Signature 81 may be constructed based on the requested query and may be passed to a Primitive Dictionary 82. The Primitive Dictionary is a component which stores all of the Primitives available in the system and their Primitive Signatures. The Primitive Dictionary finds a Primitive object 83 matching the Primitive Signature 81, and passes it to the Query Execution layer 70, to be used in a given Primitive Instance.

The efficiency of the Primitives (how efficiently the primitive can be executed, how much processing time is needed to execute the primitive, etc.) described above depends on the algorithm chosen to implement each primitive and the way the code was compiled. In addition, the efficiency of the primitives also may be influenced by the environment: hardware, data distributions, query parameters, concurrent query workload, and the interactions between these elements. The high complexity of computer systems, with their complex cache hierarchies, out-of-order execution capabilities and constraints, SIMD instruction support etc. combined with the dynamic aspects of the environments where the primitives are applied, make it impossible to correctly choose one optimal implementation for a particular primitive even for a known workload.

The problem of multiple possible kinds of Primitives for a given Primitive Signature is addressed by Micro Adaptivity system, which allows multiple Primitive implementations. The microadaptivity system improves the raw performance as well as performance stability in the query-execution layer of the database system. Any improvement in this layer directly translates to query performance improvements.

Micro Adaptivity System Embodiment in a Database System

Figure 6A:
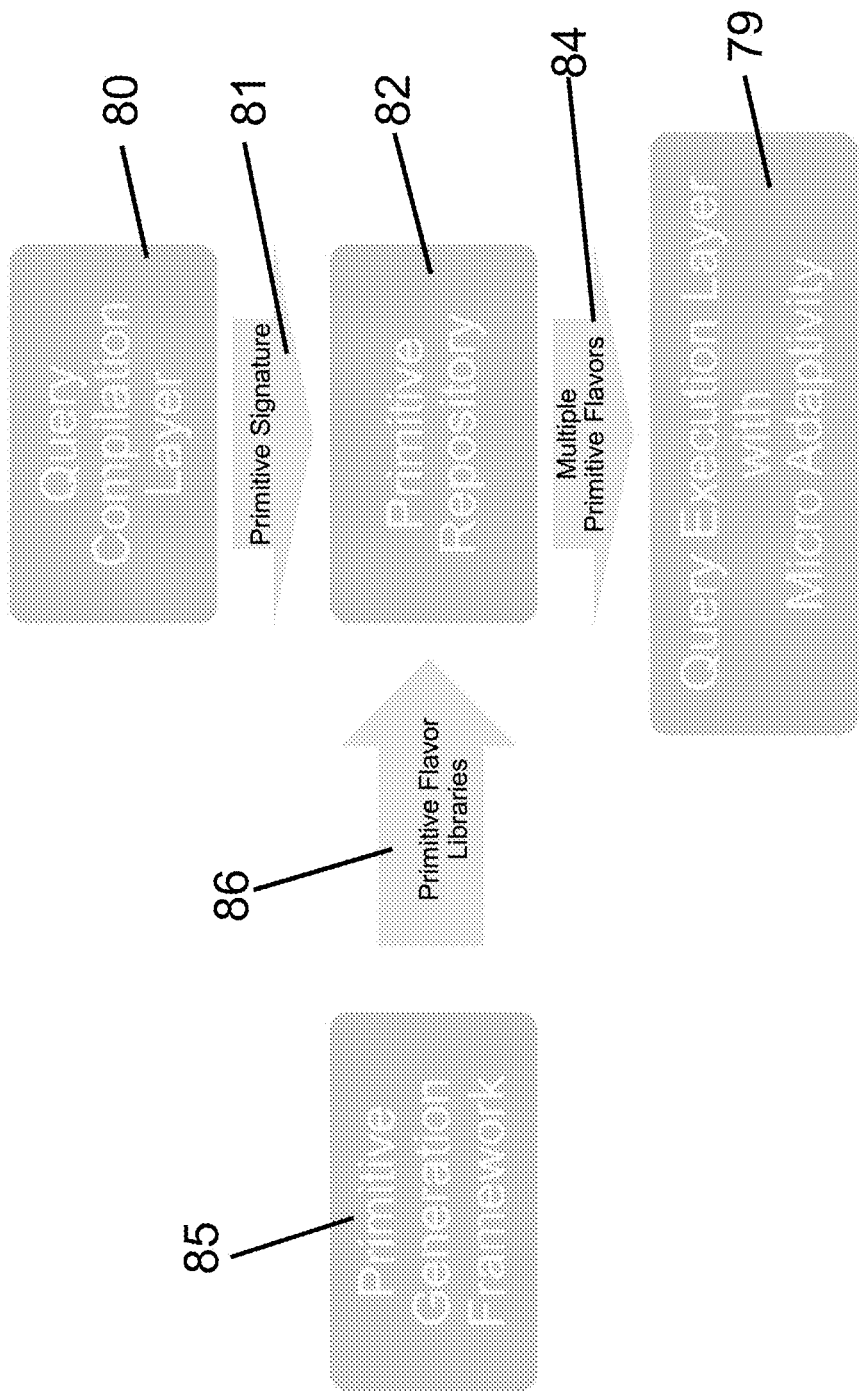
FIG. 6A is a block diagram illustrating obtaining a collection of Primitive Flavors in a system with Micro Adaptivity.

The micro adaptivity system and method adds several elements to a standard database system as shown in FIG. 6A. The elements of the micro adaptivity system in FIG. 6 may each be implemented in hardware (working in conjunction with the database engine 52) or as software that is within the database engine 52. The micro adaptivity system may include:

Primitive Flavors: Instead of having a single Primitive for each Primitive Signature, the system now stores multiple versions of a Primitive for each Primitive Signature. These different versions we call "Primitive Flavors" 84.

Primitive Flavor Libraries: Different Primitive Flavors for the same Primitive Signature can be created using different methods, including: different compilers; different compiler options; different algorithmic implementations. Collections of Primitive Flavors can be compiled together into separate object files known as Primitive Flavor Libraries 86. The system is extended with the ability to link with or dynamically load multiple Primitive Flavor Libraries. Each Primitive Flavor Library registers its Primitive Flavors, under their respective Primitive Signatures, in the Primitive Dictionary, providing additional meta-information (e.g. the source of the Primitive Flavor) useful for e.g. performance profiling or debugging.

Primitive Dictionary Repository 82: This component is extended to be able to store multiple Primitive Flavors for each Primitive Signature. Primitive Flavor Libraries register multiple Primitive Flavors in it. When asked for a particular Primitive Signature, depending on the request type, it can now return either a single (default) Primitive, or a collection of Primitive Flavors, all implementing the functionality of the same Primitive. Primitive Flavors are kept using additional meta-information, which might include: flavor source meta-information (e.g. code version, compiler used, etc), number of times it was used and some performance characteristics, both delivered with primitive as well as gathered during runtime. Primitive Dictionary provides a registration mechanism through which a software component can register and load additional Primitives and Primitive Flavors dynamically on startup or even while the system is active.

Primitive Generation Framework: To generate multiple Primitive Flavors and Primitive Flavor Libraries, a Primitive Generation Framework 85 is used in the microadaptivity system as shown in FIG. 6A. The Primitive Generation Framework 85 creates different implementations based on one or more dimensions such as:

Different source-code level implementations of the same Primitive are possible. They can be distinguished by the Primitive Generation Framework on the compilation time by
providing different source files with different implementations
providing source files containing multiple implementations, and using compiler-time options to choose between them (for example, -D option in the GCC compiler)

Different compilation options
Different compilers used, e.g. GCC, ICC, Microsoft C Compiler
Different optimization options, e.g. "-O3" in GCC Combination of these dimensions can result in very many Primitive Flavors for the same Primitive. Primitive Generation Framework also provides facility to find identical Primitive Flavors in different Primitive Flavor Libraries and annotate them as such or eliminate them, to reduce the number of Primitive Flavors considered during the Query Execution phase.

Query Execution: In the query execution component 79, for each Primitive Instance, the system observes the performance of different Primitive Flavors, and chooses the one it thinks to be optimal at a given moment that may be known as an Active Flavor. In that flavor-optimization phase, a few optimization techniques may be used: exploitation—once an Active Flavor is detected, it is being used for some time, to avoid frequent re-optimization, which carries some cost; exploration—periodically switching to currently inactive flavors to see if their performance might be now better than the Active Flavor; degradation detection—when the performance of the Active Flavor suddenly deteriorates, the system can choose to look at other possibilities. In the implementation in a Vectorwise system, the above logic can be encapsulated in the expression evaluation code, making all changes local and transparent to other parts of the system.

Figure 6B:
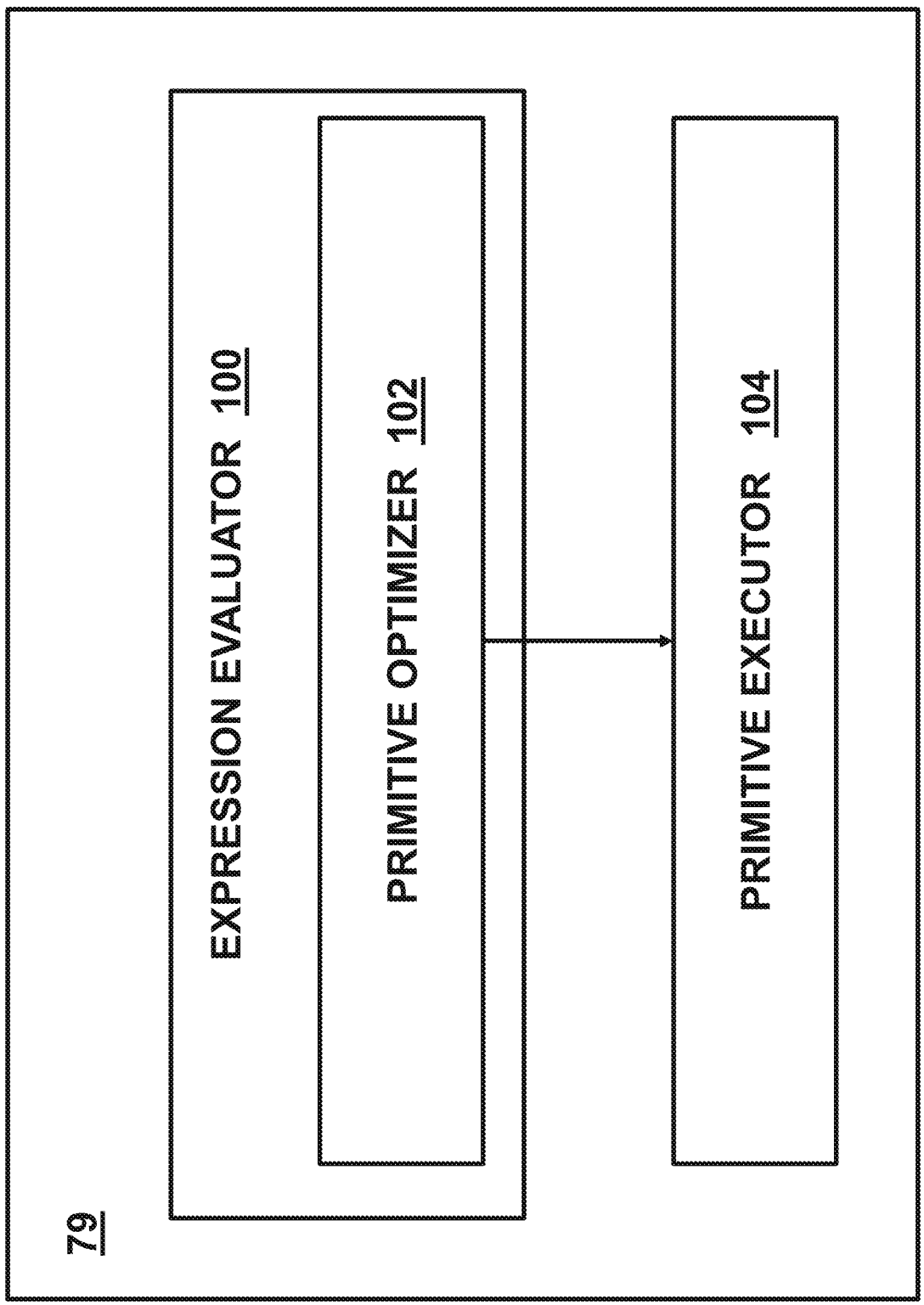
FIG. 6B illustrates more details of an expression evaluator of the microadaptivity system.
Figure 7:
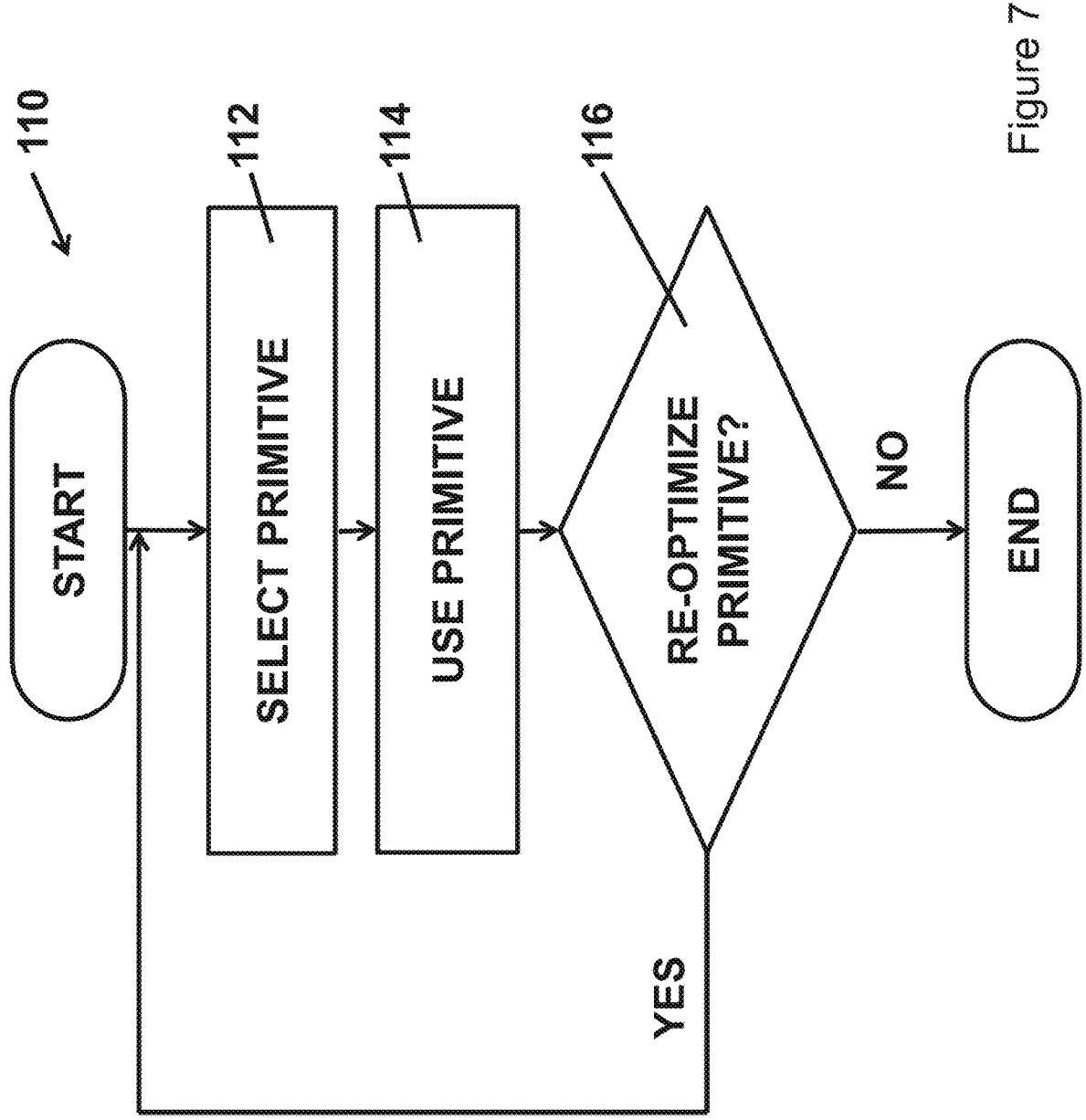
FIG. 7 is a flowchart of a method for selecting a primitive using the microadaptivity system.
Figure 8:
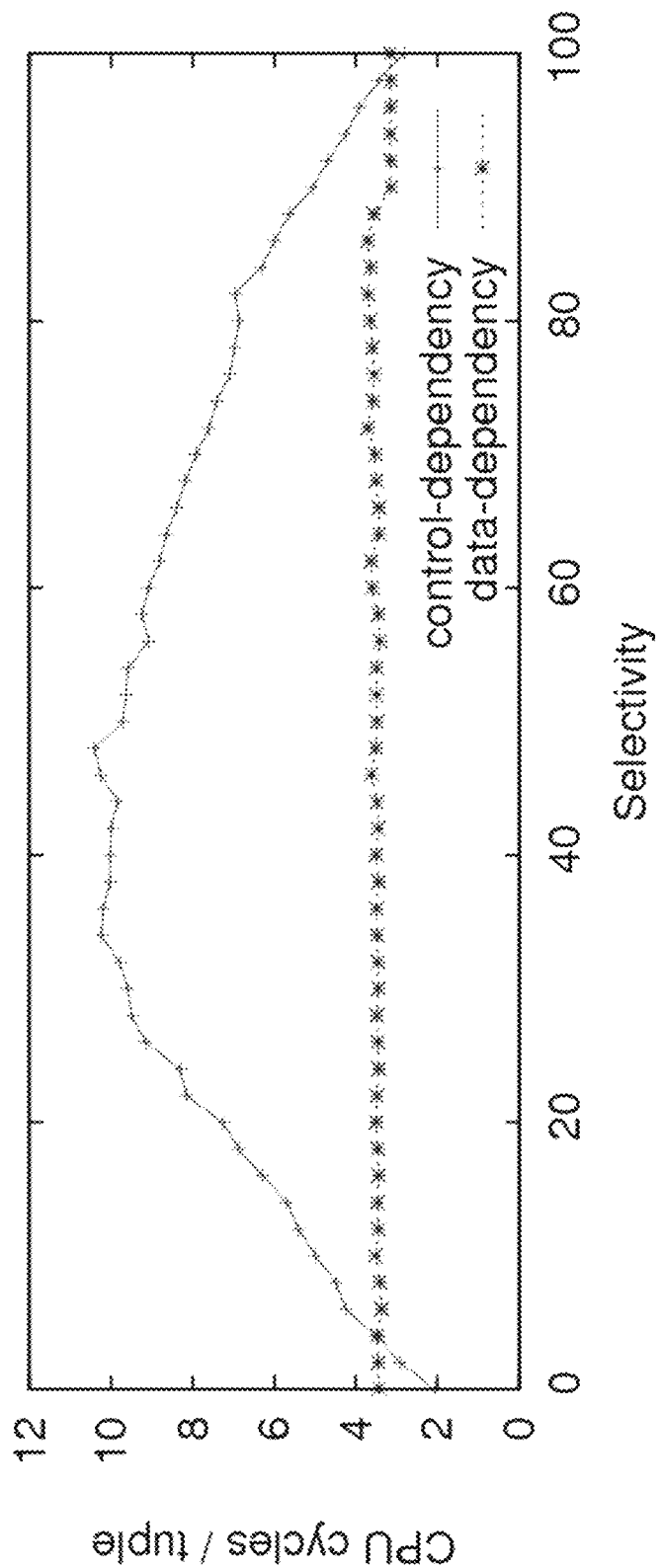
FIG. 8 presents performance difference between two implementations of the same function performing data selection.

FIG. 6B illustrates more details of the query execution layer 79 that may include an expression evaluator of the microadaptivity system. FIG. 7 is a flowchart of a method 110 for selecting a primitive using the microadaptivity system. Specifically, the query execution layer 79 may include an expression evaluator 100 that evaluates each expression that is part of a query. As part of that expression evaluation, the expression evaluator 100 selects one or more primitives for each expression to perform the query. The expression evaluator 100 may have a primitive optimizer 102 that may select a best flavor for a particular primitive (112) for a particular expression as described in more detail below with an example of an implementation of the primitive optimizer 102. Once the flavor of a primitive is selected (and becomes the active flavor), the primitive is passed onto a primitive executor 104 that executes the active flavor (114) of the primitive for the particular query. As described below, the flavor of a particular primitive may be changed (116) and reoptimized. In this manner, the microadaptivity system and method adjust and optimizes, on a primitive level, the specific flavor of a primitive used to execute a particular query expression at a particular time.

Examples of Different Primitive Flavors

The microadaptivity system may have different kinds of Primitive-generation aspects where different Primitive Flavors with different performance characteristics are possible. The below list is for example only and not exhaustive.

1. Generating selection primitives implemented using either "branching" and "no-branching" flavors, see discussion above
2. Generating any type of primitives using different compilers and/or compiler options
3. Generating primitives performing memory-accessing functionality by applying a loop-fission technique or not
4. Generating of "map" (scalar-functions) primitives in presence of selection vectors by applying or not the "full-computation" principle.
5. Generating of any type of primitives by applying or not a manual loop-unrolling technique.

Compiler Variations (Different Compilers and/or Compiler Options

One of the easiest ways to obtain different flavors is to compile the primitive with different compilers and switches.

Branch vs. No-Branch

An example of context-dependent performance are branching and non-branching implementations of Selection primitives. The branching primitives use the if statements to test a predicate while the non-branching primitives use logical operators and index arithmetic to completely remove any branching.

Listing 1: Branching Less-than Selection Primitive
```
size_t
select_less_than (size_t n, int*res, int*col, int*val)
{size_t k=0, i;
int v=*val;
for (i=0; i<n; ++i)
if (col [i]<v]) res[k++]=i;
return k;
}
```

The selection primitive in Listing 1 above accepts as arguments a vector col of ints and its size n, a constant val, and a vector res where to store the result. It produces a selection vector with the indices of the elements in the input vector which have a value strictly less than the constant value. The selection vector is then passed to other primitives. The Branching implementation in Listing 1 uses a branch while the primitive shown in Listing 2 below is branchfree (No-Branching). These implementations are functionally equivalent: they always produce the same result.

Listing 2: No-Branching less-than Selection primitive
```
size_t
select_less_than (size_t n, int*res, int*col, int*val)
{size_t k=0, i;
intv=*val;
for (i=0; i<n; ++i){
res [k]=i;
k+=(col [i]<v);
}
return k;
}
```

The No-Branching implementation is Listing 2 always performs the same number of operations, while with Branching, this depends on the data. If the data is such that the branch is almost never taken, then the Branching implementation will do less work, as it avoids executing the code that generates a result. What is the fastest implementation depends on the data Loop Fission Certain implementation of a database management system, such as Vectorwise, uses bloom filters to accelerate hash-table lookups in situations where the key is often not found. Using a bloom filter is faster because hash-table lookup is CPU-intensive and the hash-table may not be in the CPU cache—whereas a bloom filter might fit as it is much smaller, and lookup is quick and simple. Still, the bloom filter may not fit the CPU cache, and the lookup primitive displayed in Listing 5 below then incurs a cache miss in the bf_get( ) call.

Listing 5: Original bloom lter primitive
```
size_t sel_bloomfilter_sint_col (size_t n, size_t*res,
   char*bitmap, sint*keys)
{size_t i, ret=0;
for (i=0; i<n; i++) {
slng hv=bf_hash (keys [i]);
res [ret]=i;
ret+=//loop dependency
bf_get (bitmap, hv); //cache miss
}
return ret;
}
```

Note, that this is a Selection primitive, identifying tuples surviving the bloom filter check, and uses a No-Branching code style.

Listing 6: Bloom lter primitive with Loop Fission
```
size_t sel_bloomfilter_sint_col (size_t n, size_t*res,
char*bitmap, sint*keys)
{size_t i, ret=0;
for (i=0; i<n; i++) {/independent iteration
slng hv=bf_hash (keys [i]);
tmp [i]=bf_get (bitmap, hv); //cache miss
}
for (i=0; i<n; ++i) {
res [ret]=i;
ret+=tmp [i];
}
return ret;
}
```

The loop fussion optimization of this bloom filter check is displayed in Listing 6 above. Rather than identifying the selected tuples inside the same loop, it just collects the Boolean result of bf_get( ) in a temporary array, and then selects from there in a separate loop. The idea behind this loop fussion variant is that it removes all dependencies between iterations of the first loop.

The loop fussion variant, when it sustains a cache miss in bf_get( ), allows the CPU to continue executing the next loop iteration(s), leveraging the large out-of-order execution capabilities of modern CPUs (>100 instructions). This way the CPU will get multiple (up to 5, on Ivy Bridge) loop iterations in execution at any time, leading to 5 concurrent outstanding cache misses, maximizing memory bandwidth utilization. In contrast, the non-ssion variant causes the iterations to wait on each other due to the loop-iteration dependency, thus achieves less concurrent cache misses and therefore lower memory throughput.

Micro-benchmarks were performed in which the number of unique keys was varied from 212 to 227, which required bloom filters with sizes from 4 KB to 131072 KB. The testing revealed that, for large bloom lters, fussion performs better, indeed sometimes 50% faster; whereas for small bloom filters where there are no cache misses fussion can be slower, sometimes by 15%.

Hand-Unrolling

The primitives in the database engine may be template-generated. The templates are used to provide type-specific versions of the same function (e.g. multiplication of integers, of doubles, of short integers, etc.). Additionally, these template macros instantiate all possible parameter combinations of vector vs. constant (e.g multiply values from two vectors, a vector with a constant or a constant with a vector). Template macros insert a body action, such as the multiplication of values, in a loop over the input vector(s).

Listing 7: Template-generated loop with hand-unrolling
```
# define BODY (i) res [i]=a[i]*b[i]
for (i=0; i+7<n; i+=8){
BODY (i+0); BODY (i+1); BODY (i+2); BODY (i+3);
BODY (i+4); BODY (i+5); BODY (i+6); BODY (i+7);
}
for (; i<n; i++)
BODY (i);
```

By changing these templates, as in Listing 7 above, a user manually introduced a well known loop-unrolling optimization into the primitives.

Query Execution Logic Details

With multiple Primitive Flavors available from the Primitive Dictionary for each Primitive Signature, the Query Execution component has to be able to make the right decision on which of the Primitive Flavors to choose for the actual data processing.

In one implementation, the system may track of the performance of each Primitive Flavor for each Primitive Instance. The typical metric used is the number of CPU clocks for each processed record. Thus, for each Primitive Flavor, the time of the last N calls is stored and the average of it is used as the expected cost in the next call.

Figure 9:
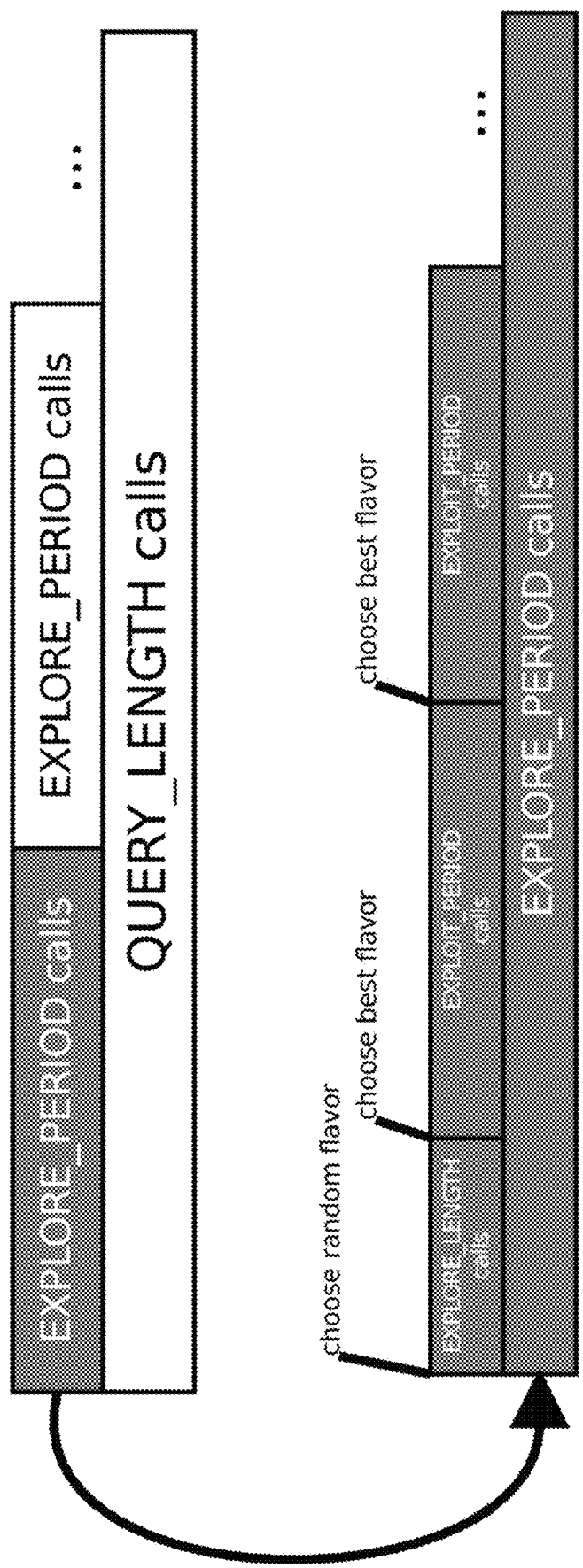
FIG. 9 represents a self-learning Primitive Choice process.

To choose the Primitive Flavor, a self-learning Primitive Choice Process may be used. In one embodiment, presented in FIG. 9, this process works as follows:

The total timeframe of processing a Primitive Instance is divided into equal-width periods of EXPLORE_PERIOD primitive calls. An example value for EXPLORE_PERIOD is 1024

At the beginning of each EXPLORE_PERIOD cycle, the exploration process happens, during which the system tries to guess the Primitive Flavor with the currently-optimal performance This happens by choosing one of the Primitive Flavors, pseudorandomly, either with equal probability to each Primitive Flavor, or giving higher probability to e.g. flavors that were previously known to achieve better performance The chosen Primitive Flavor is used for EXPLORE_LENGTH calls, and its current performance statistics are updated. The example value of EXPLORE_LENGTH is 32.

This process allows detection of a situation, when some Primitive Flavor not currently used suddenly becomes optimal. If it is chosen for the exploration, and its performance is better than that of the Active Flavor, it will be used from now on.

After the exploration phase, the exploitation phase follows. In that phase, the best Primitive Flavor according to currently available information is chosen as Active Flavor and used for the next EXPLOIT_LENGTH calls. The example value of EXPLOIT_LENGTH is 256

Every EXPLOIT_LENGTH calls the performance is re-evaluated, and a possibly different Active Flavor is chosen This process allows detection of a situation, when the currently used Active Flavor suddenly drops performance. If it goes below the performance of some other known Primitive Flavor, that other Primitive Flavor will become the Active Flavor in the next exploitation phase.

The process above was shown to choose the optimal flavor with high accuracy and low overhead. The process may be optionally extended with a special initial exploration phase, during which all known flavors are first tested one after another on the input data—this provide complete information for the follow up exploration and exploitation phases.

For example, the process to select/optimize the primitive may be implemented as follows:

```
function vw—greedy (prim, tuples, cycles) {
//classical primitive profiling
prim.tot_cycles+=cycles;
prim.tot_tuples+=tuples;
prim.calls++;
//vw—greedy switching
if (prim.calls==prim.calc_end) {
  //calc average cost in previous period
  prim.flavor.avg_cost=
  (prim.tot_cycles—prim.prev_cycles)/
  (prim.tot_tuples—prim.prev_tuples);
  if (prim.calls >prim.explore_period){
    //perform exploration
    prim.explore_period+=EXPLORE_PERIOD;
    prim.flavor=get_random_flavor ( )
    prim.calc_end=EXPLORE_LENGTH;
  } else {
    //perform exploitation
    prim.flavor=get_best_flavor ( )
    prim.calc_end=EXPLOIT_PERIOD;
  }
  //ignore first 2 calls to avoid
  //measuring instruction cache misses
  prim.calc_start=prim.calls+2;
  prim.calc_end+=prim.calc_start;
}
if (prim.calls==prim.calc_start) {
  prim.prev_tuples=prim.tot_tuples;
  prim.prev_cycles=prim.tot_cycles;
}
}
```

In addition to the above described primitive selection, the microadaptivity system may have a data recorder component that record data during the execution of each query. The recorded data may include statistics about the data being processed (e.g. selectivity, cardinality). The recorded data may also include performance of executed function implementations (e.g. CPU cycles spent, number of cache misses). The recorded data may be made persistent, such as being stored in a persistent memory or storage device) so that the recorded data may be reloaded when the system starts. The recorded data may be used to perform decisions on which flavor of a primitive to choose in the next iteration of a given primitive.

Benchmark Results

The MicroAdaptivity system and method was tested on a set of the 22 queries from the TPC-H Benchmark (See [TPC-H]) using a 100 GB generated database.) For the different types of aspects listed above that influence primitive generation, primitives were tested using one of the possible approaches. During the test, how well MicroAdaptivity performed dynamically choosing primitives was measured. In addition, the testing simulated the "optimal" process where, for each function call, the testing measured the time of the fastest of the available flavors.

FIGS. 10(a)-10(e) demonstrates these results. For each primitive-generation aspect, the testing used one implementation as a base. The testing then measured the time spent in all primitives influenced by this aspect and then performance improvement over this base result of different options within this aspect, as well as of the Micro Adaptive and Optimal solutions. The results demonstrate that there often is a significant performance difference between different flavors. For example, for loop-fission optimization (FIG. 10(c)), primitives always applying this optimization are on average 1.40× faster. Still, in all cases neither of the flavors is optimal. Micro Adaptivity manages to consistently provide significant performance improvements over every single flavor, and is consistently close to the optimal solution.

FIG. 11 demonstrates a total performance benefit of Micro Adaptivity over the 22 used TPC-H queries. Here, the testing also compared it to a system where different flavors are chosen not based on observed performance, but on heuristics. For example, the "branching" flavor is used for selectivities below 10% and above 90% and the "no-branching" flavor is used in other cases. Even over such a system heuristics, Micro Adaptivity consistently provides an advantage (in terms of the number of seconds to perform each query.) FIG. 11 also demonstrates a very important benefit of Micro Adaptivity from the software engineering perspective. Since software systems usually ship with only a single implementation of performance-critical functions, the shipped function is often the one performing best on average, providing a compromise for different options. Finding such "best average" function is very work-intensive, especially if the system has many functions. Also, the "best average" function might be best only on some hardware, while on other (including future hardware), other solutions might perform better. This is demonstrated by FIG. 10(c). When the "loop fission" optimization was considered in Vectorwise in 2009, the hardware used at that moment benefited only partially from this optimization, hence it was not enabled. In 2012, it is clear that this is a better option by default. With Micro Adaptivity, engineers can put all promising flavors into the system, and let the Micro Adaptivity framework decide which one to choose dynamically. The above results demonstrate that Micro Adaptivity can be beneficial for performance, by choosing the best function flavors and avoiding bad ones, but can also provide benefits in software engineering time, reducing time spent on complex and error-prone code tuning.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A data processing system, comprising:
a computer having a processor;
a database engine having a query execution component on the computer that can adapt an execution of a plurality of queries, wherein each query has one or more primitive functions that are used to evaluate the query, each primitive function having one or more instructions configured to be executed by the query execution component;
the database engine storing a plurality of flavors for each primitive function, wherein each flavor of each primitive function is a primitive function using a manual loop unrolling and a primitive function that does not use the manual loop unrolling;
an expression evaluator on the computer that evaluates each expression in each query; and
a primitive optimizer on the computer that selects a flavor of a primitive function for each primitive function-used in each query.

2. The system of claim 1, wherein the primitive optimizer switches between the plurality of flavors for each primitive function.

3. The system of claim 2 further comprising a data recorder that records data associated with the execution of each query using a selected flavor of each primitive function in each query.

4. The system of claim 3, wherein the data associated with the execution of each query is statistics about the data being processed in each query.

5. The system of claim 3, wherein the data associated with the execution of each query is a measure of performance of the flavor of each primitive function executed for each query.

6. The system of claim 3, wherein the data recorder persistently stores the data so the data is reloaded.

7. The system of claim 3, wherein the primitive optimizer uses the data to choose a flavor of a primitive function.

8. The system of claim 2, wherein the primitive optimizer uses an initial exploration phase to study performance of each flavor of a primitive function.

9. The system of claim 3, wherein the primitive optimizer uses an exploration phase during which the data recorded for each query is ignored and an exploitation phases during which the data recorded for each query is used to switch between the plurality of flavors for a primitive function.

10. The system of claim 1 further comprising a repository that stores the plurality of flavors for each primitive function.

11. The system of claim 10, wherein the repository stores one or more flavors and a process to select the flavor of the primitive function.

12. The system of claim 10, wherein the repository contains the plurality of flavors of a primitive function, wherein each flavor of the primitive function is generated by one of compiling the primitive function with a different compiler and compiling the primitive using a different compile option.

13. The system of claim 10, wherein the repository contains a plurality of flavors of memory accessing primitives function.

14. The system of claim 10, wherein the repository contains a plurality of flavors of map functions.

15. The system of claim 10, wherein the repository contains a plurality of flavors of memory prefetching instructions at multiple prefetch distances.

16. The system of claim 11, wherein the repository stores a plurality of processes to select the flavor of the primitive, wherein the processes include a process using control dependency and a process using data dependency.

17. The system of claim 11, wherein the one or more flavors of a primitive is a primitive using a manual loop unrolling.

18. A method for selecting a primitive to be used in a query of a database, the method comprising:
    storing a plurality of flavors for each primitive function, wherein each flavor of each primitive function is a primitive function using a manual loop unrolling and a primitive function that does not use the manual loop unrolling;
    exploring, during an explore period, a flavor of a primitive function to select as an active flavor, the primitive function having one or more instructions configured to be executed by a query execution component; and
    selecting, during an exploitation phase following the explore period, an active flavor for the primitive function based on data about an execution of one or more queries.

19. The method of claim 18, wherein exploring the flavor of a primitive function further comprises selecting pseudo-randomly the flavor of the primitive function based on one of an equal probability to each flavor and a higher probability of a predetermined flavor.

20. The method of claim 19, wherein the selected flavor of the primitive function is used during an explore length time period and further comprising capturing data about the execution of the selected flavor of the primitive function.

21. The method of claim 20, wherein selecting during the exploitation phase further comprises using the selected active flavor during an exploit length.

22. The method of claim 21 further comprising re-optimizing, at the end of the exploit length, the plurality of flavors for the primitive function based on data about an execution of one or more queries.

* * * * *